US012496514B2

(12) United States Patent
Lu et al.

(10) Patent No.: US 12,496,514 B2
(45) Date of Patent: Dec. 16, 2025

(54) GAME CONTROLLER

(71) Applicant: DEXIN CORP., New Taipei (TW)

(72) Inventors: Ho Lung Lu, New Taipei (TW); Hung-Yi Fan, New Taipei (TW); Min-Chien Chang, New Taipei (TW)

(73) Assignee: DEXIN CORP., New Taipei (TW)

( * ) Notice: Subject to any disclaimer, the term of this patent is extended or adjusted under 35 U.S.C. 154(b) by 287 days.

(21) Appl. No.: 18/126,335

(22) Filed: Mar. 24, 2023

(65) Prior Publication Data

US 2024/0165502 A1 May 23, 2024

Related U.S. Application Data

(60) Provisional application No. 63/427,689, filed on Nov. 23, 2022.

(30) Foreign Application Priority Data

Feb. 22, 2023 (TW) ................................ 112106438

(51) Int. Cl.
*A63F 13/24* (2014.01)
*A63F 13/23* (2014.01)

(52) U.S. Cl.
CPC .............. *A63F 13/24* (2014.09); *A63F 13/23* (2014.09)

(58) Field of Classification Search
CPC ................................ A63F 13/24; A63F 13/23
See application file for complete search history.

(56) References Cited

U.S. PATENT DOCUMENTS

2007/0178966 A1* 8/2007 Pohlman ................ A63F 13/06 463/36
2023/0182011 A1* 6/2023 Vroom .............. H04M 1/72409 463/39

* cited by examiner

*Primary Examiner* — Yingchuan Zhang
(74) *Attorney, Agent, or Firm* — Maschoff Brennan

(57) ABSTRACT

A game controller includes a first control handle and a second control handle. The first control handle includes a first handle portion and a recess mount portion disposed on the first handle portion. The second control handle includes a second handle portion and a protrusion mount portion disposed on the second handle portion. The protrusion mount portion is slidably accommodated in the recess mount portion. When the game controller is in a combined mode, the first handle portion and the second handle portion are combined with each other for being cooperated with a game host. When the game controller is in a separated mode, the first handle portion is separated from the second handle portion so as to form an installation space between the first handle portion and the second handle portion for a mobile device to be installed therein.

8 Claims, 10 Drawing Sheets

10

GAME CONTROLLER

CROSS-REFERENCE TO RELATED APPLICATIONS

This non-provisional application claims priority under 35 U.S.C. § 119(a) on provisional patent application No(s). 63/427,689 filed in U.S.A. on Nov. 23, 2022, and on patent application No(s). 112106438 filed in Taiwan, R.O.C. on Feb. 22, 2023, the entire contents of which are hereby incorporated by reference.

TECHNICAL FIELD

The disclosure relates to a game controller, more particularly to a game controller suitable for a mobile device and a video game console.

BACKGROUND

With the popularity of mobile phones with touch screens (e.g., iPhone and Android phones), the game market for mobile phones has also expanded rapidly, and the revenue of mobile games has even surpassed the total revenue of video games and PC games.

Generally, when a player would like to play a mobile game, the player may require a game controller which is for the mobile game. On the other hand, when the player would like to play a video game, the player may require a game controller for the video game. However, the aforementioned game controllers are merely suitable for the mobile game and the video game, respectively. As a result, the player spends a lot of money on buying different game controllers, and an additional space for storing the game controllers is required. On other hand, when one of game controllers is lost, the player is unable to play the mobile game or the video game.

SUMMARY

The disclosure provides a game controller which is suitable for both of mobile games and video games.

One embodiment of the disclosure provides a game controller. The game controller is adapted to be cooperated with a game host or a mobile device. The game controller includes a first control handle and a second control handle. The first control handle includes a first handle portion and a recess mount portion disposed on the first handle portion. The second control handle includes a second handle portion and a protrusion mount portion disposed on the second handle portion. The protrusion mount portion is slidably accommodated in the recess mount portion. The protrusion mount portion is slidable relative to the recess mount portion so as to allow the first control handle and the second control handle to be in a combined mode and a separated mode. When the game controller is in the combined mode, the first handle portion and the second handle portion are combined with each other for being cooperated with the game host. When the game controller is in the separated mode, the first handle portion is separated from the second handle portion so as to form an installation space between the first handle portion and the second handle portion for the mobile device to be installed therein.

According to the game controller as discussed in the above embodiment, the first handle portion and the second handle portion may be combined with or separated from each other so as to be in the combined mode or the separated mode via the cooperation of the recess mount portion and the protrusion mount portion. As a result, one game controller can be suitable for the game host and the mobile device.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
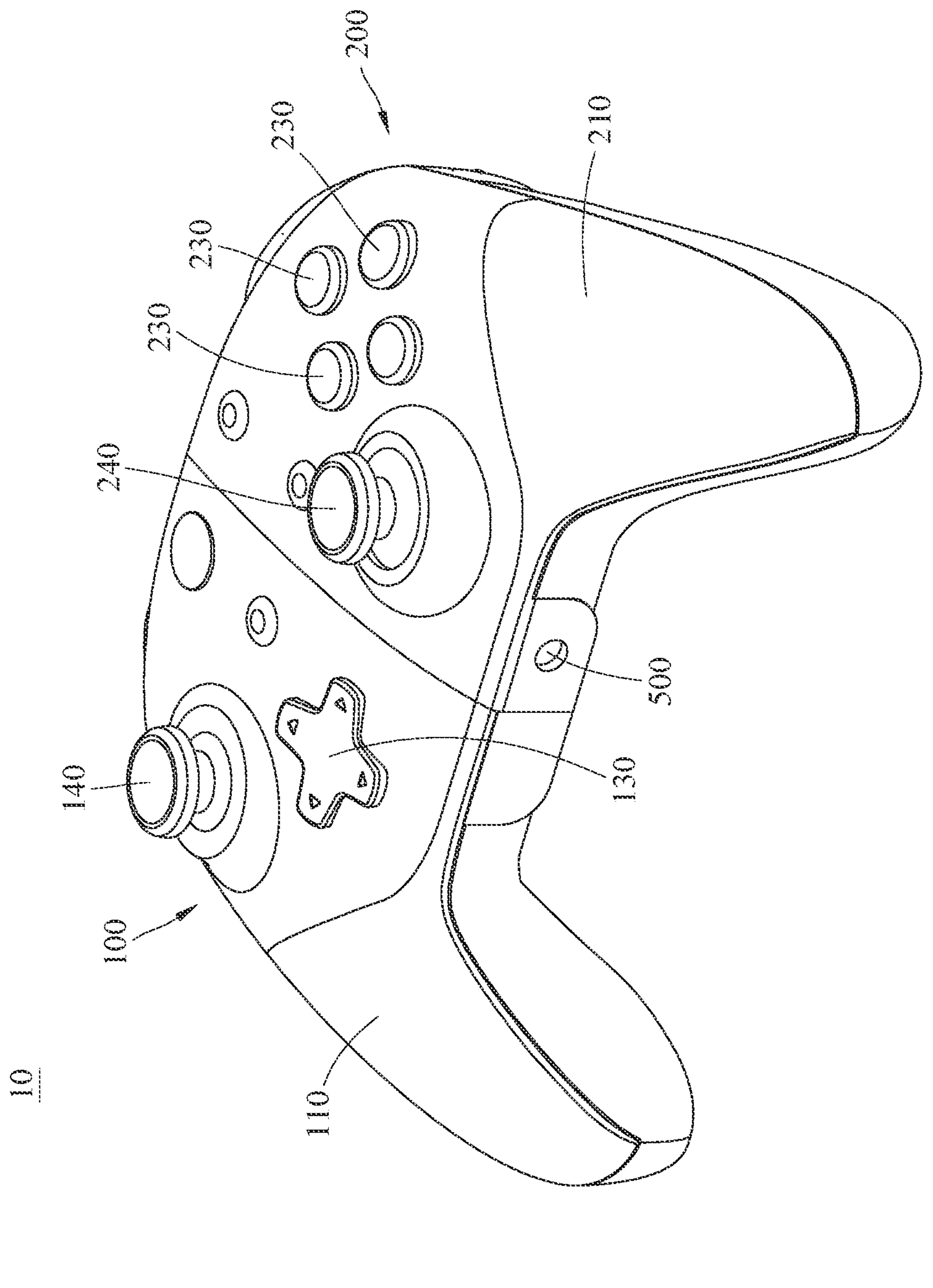
FIG. 1 is a perspective view of a game controller in a combined mode according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
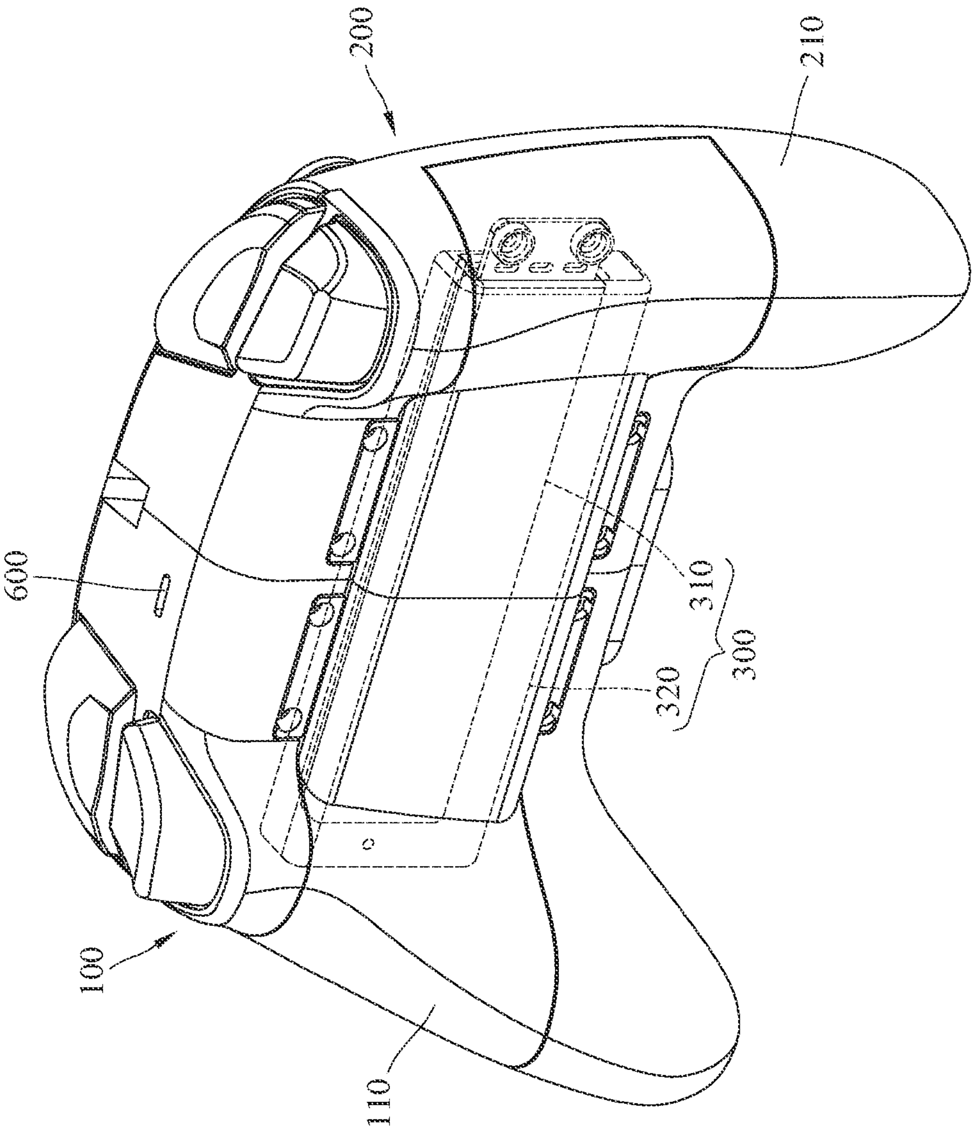
FIG. 2 is another perspective view of the game controller in FIG. 1.

Referring to FIGS. 1 and 2, FIG. 1 is a perspective view of a game controller 10 in a combined mode according to one embodiment of the disclosure, and FIG. 2 is another perspective view of the game controller 10 in FIG. 1.

Figure 8:
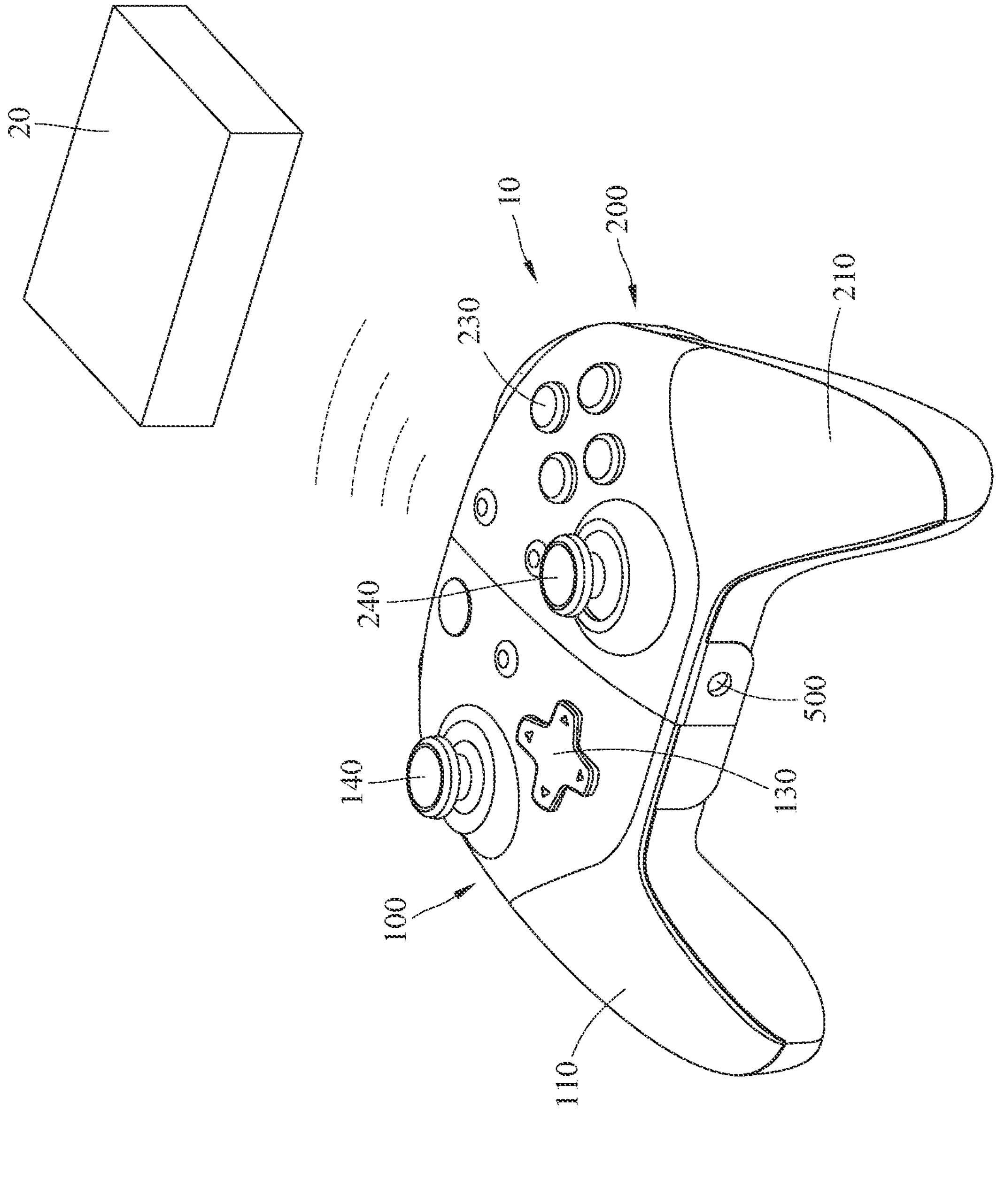
FIG. 8 is a perspective view of the game controller in FIG. 1 when being cooperated with a game host.
Figure 9:
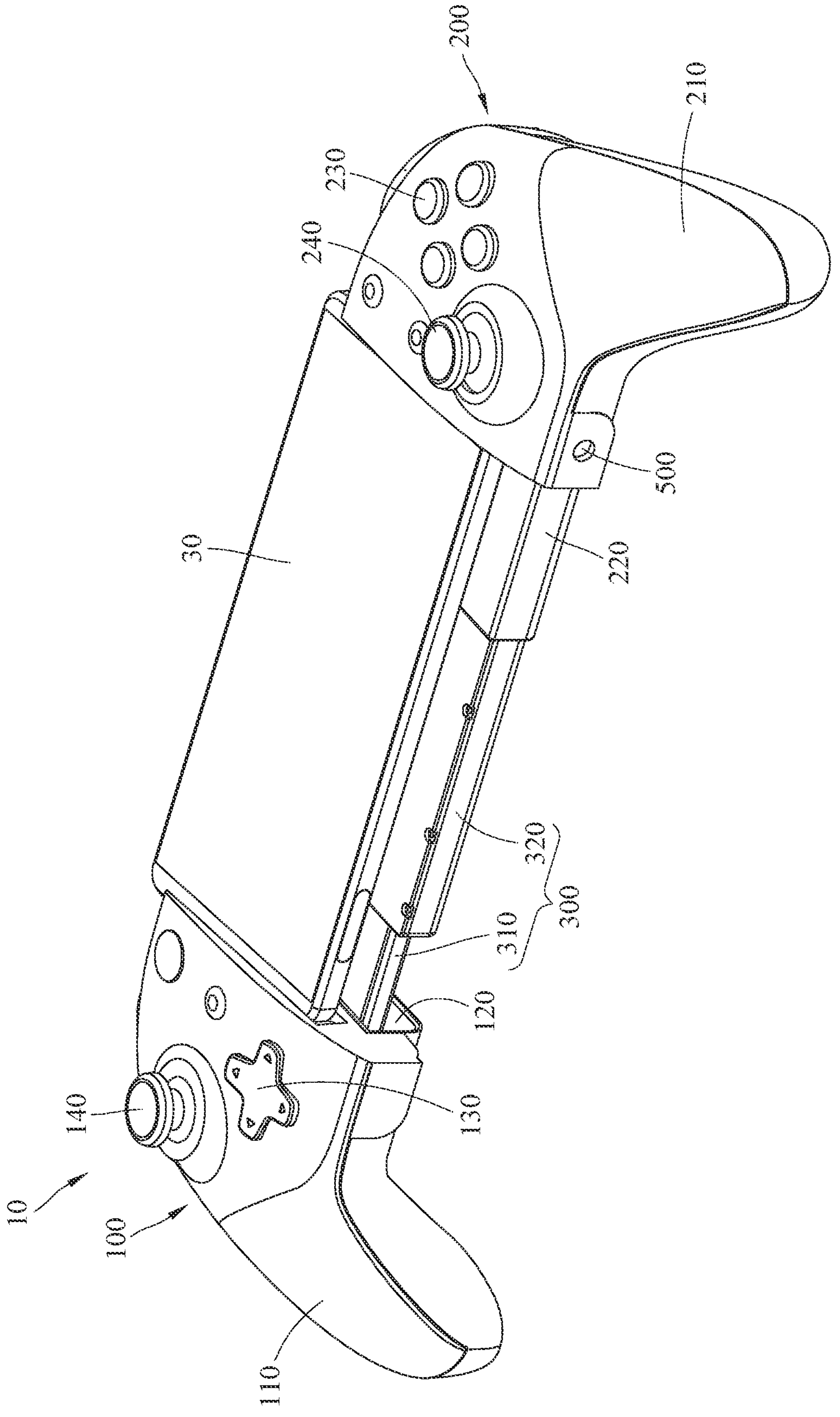
FIGS. 9 and 10 are perspective views of the game controller in FIG. 3 when being cooperated with a mobile device.

In this embodiment, the game controller 10 is adapted to be cooperated with a game host 20 (e.g., shown in FIG. 8) or a mobile device 30 (e.g., shown in FIG. 9). The game host is, for example, an Xbox or a PS5. The mobile device 30 is, for example, a smart phone or a tablet computer which is in iOS or android system. The communication between the game controller 10 and the game host 20 or the mobile device 30 may be achieved by a wireless or wire manner.

Figure 3:
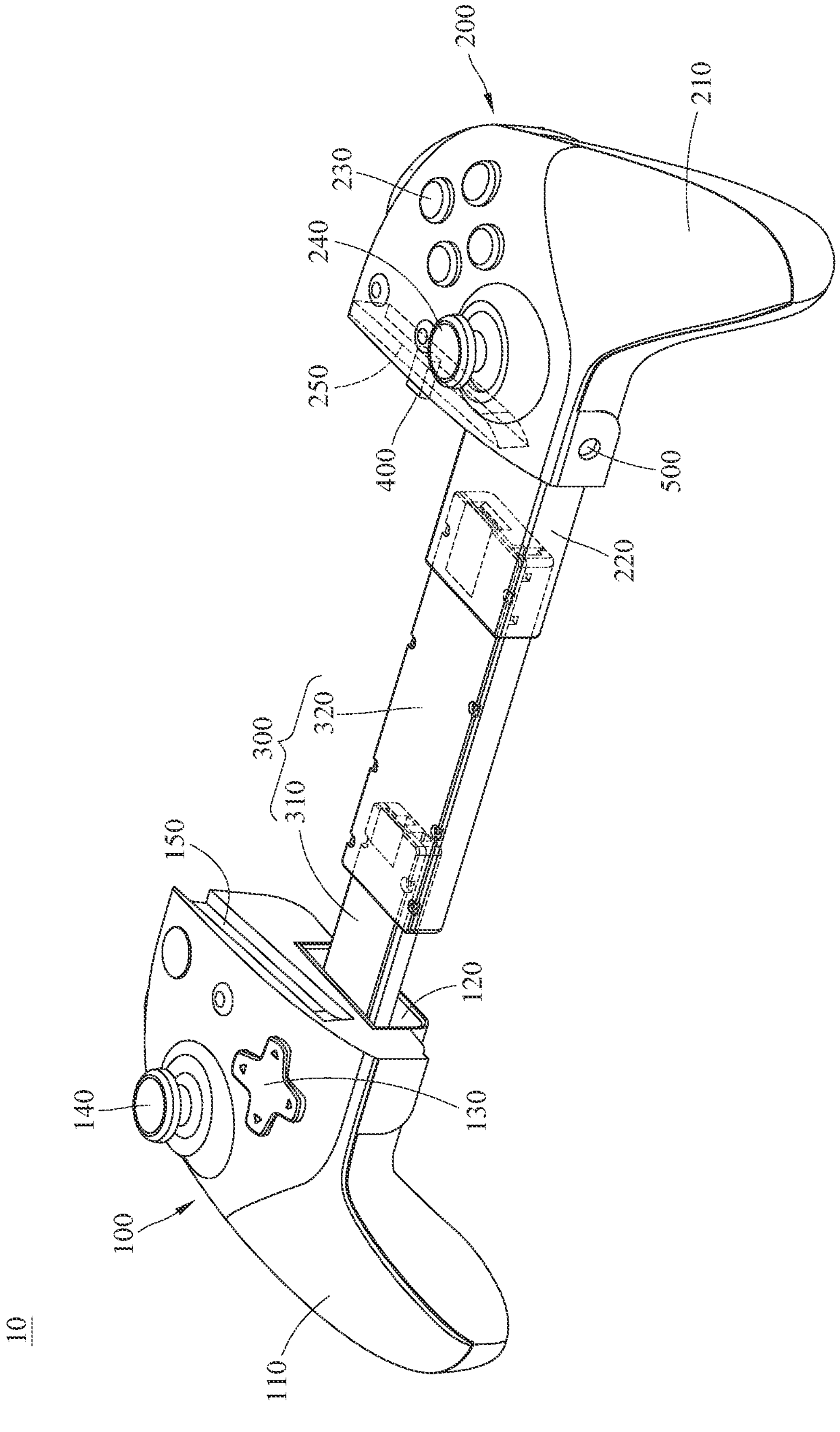
FIG. 3 is a perspective view of the game controller in FIG. 1 in a separated mode.
Figure 4:
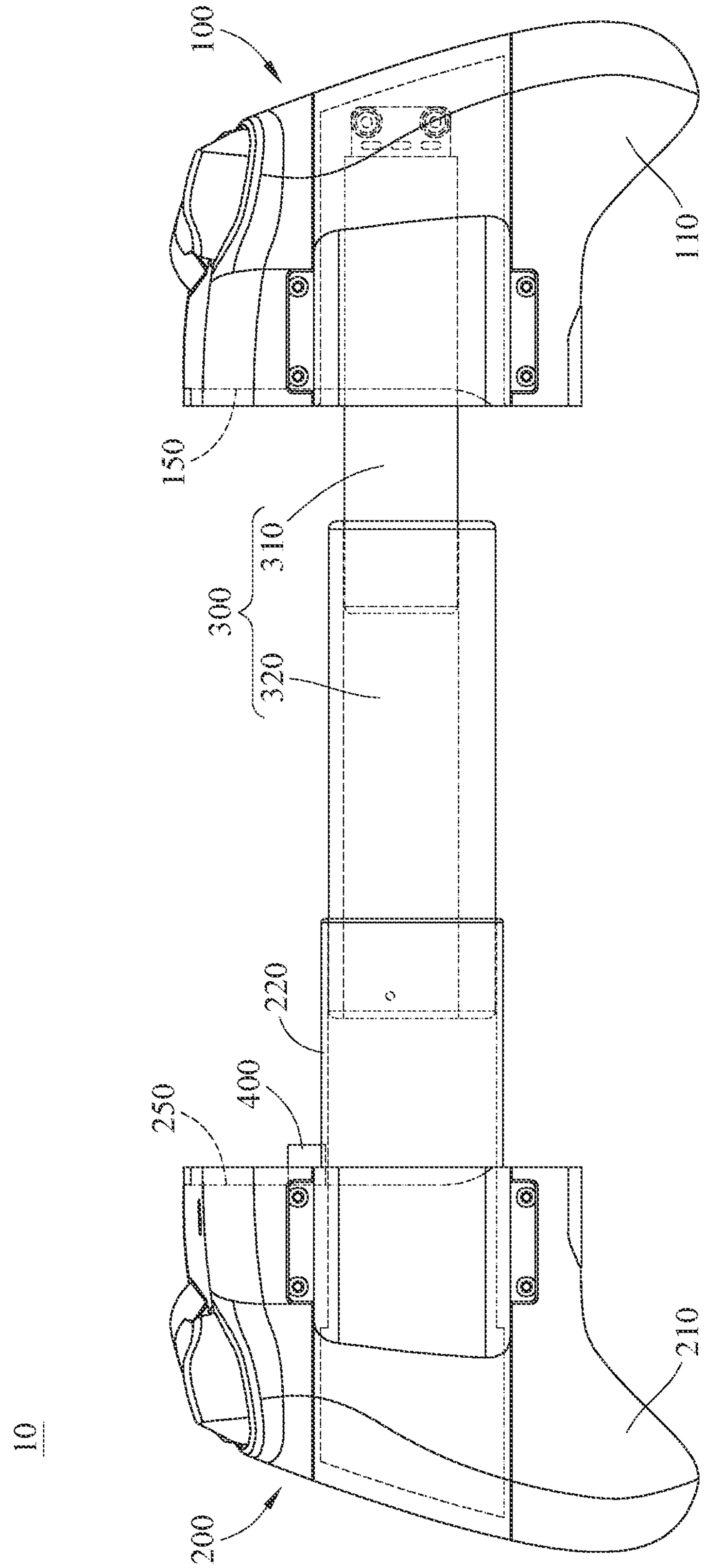
FIG. 4 is another perspective view of the game controller in FIG. 3.
Figure 5:
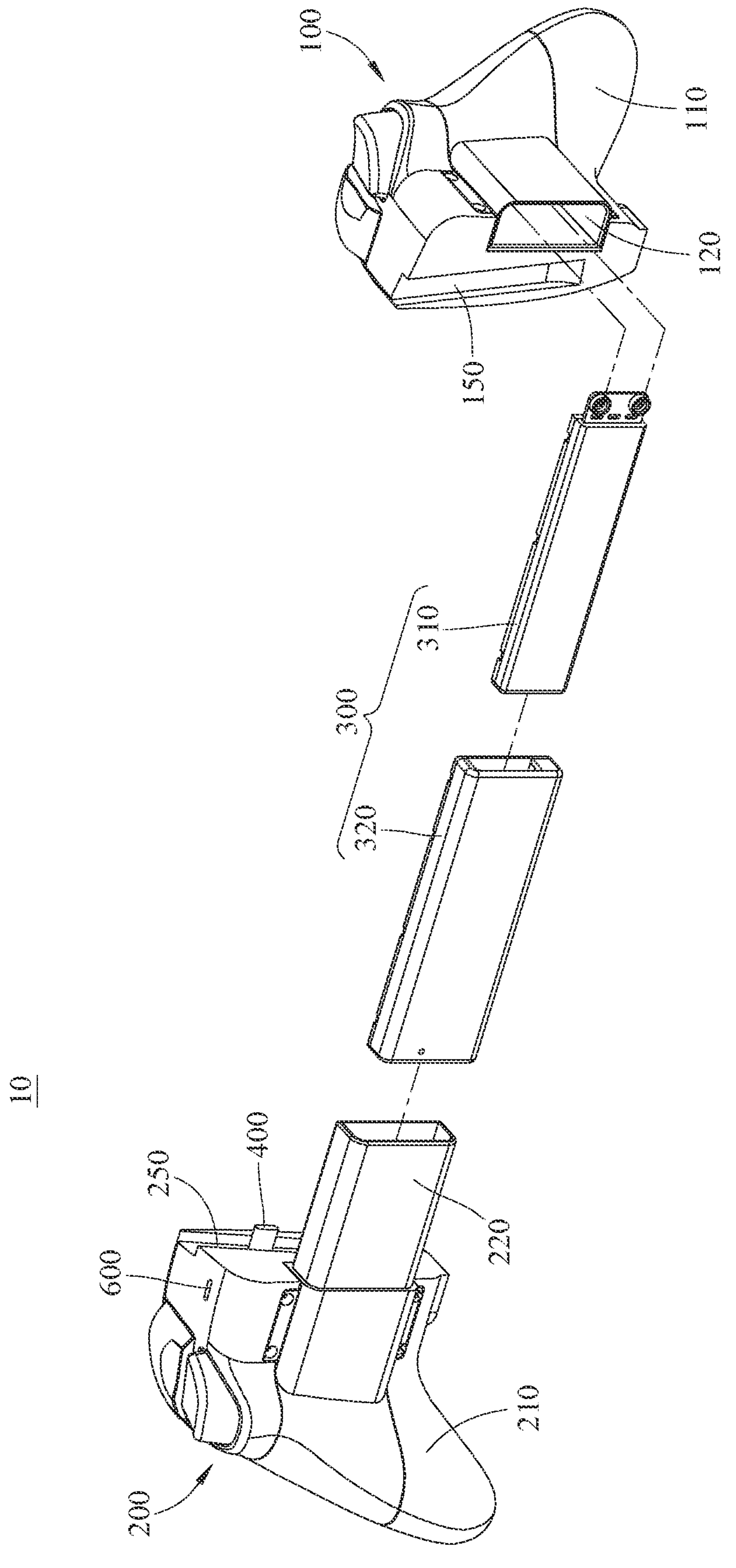
FIG. 5 is an exploded view of the game controller in FIG. 3.

Referring to FIGS. 3 to 5, FIG. 3 is a perspective view of the game controller 10 in FIG. 1 in a separated mode, FIG. 4 is another perspective view of the game controller 10 in FIG. 3, and FIG. 5 is an exploded view of the game controller 10 in FIG. 3.

The game controller 10 includes a first control handle 100 and a second control handle 200. In addition, the game controller 10 may further include a stretchable assembly 300. The first control handle 100 includes a first handle portion 110 and a recess mount portion 120. The recess mount portion 120 is, for example, a recess and is disposed on the first handle portion 110. The second control handle 200 includes a second handle portion 210 and a protrusion mount portion 220. The protrusion mount portion 220 is, for example, a protrusion and is disposed on the second handle portion 210. The protrusion mount portion 220 protrudes from one side of the second handle portion 210 and is slidably accommodated in the recess mount portion 120.

In this embodiment, the protrusion mount portion 220 is slidable relative to the recess mount portion 120 so as to allow the first control handle 100 and the second control handle 200 to be in a combined mode or a separated mode. When the game controller 10 is in the combined mode, the protrusion mount portion 220 is entirely accommodated in the recess mount portion 120, such that the first handle portion 110 and the second handle portion 210 are combined with each other for being cooperated with the game host 20; that is, the first handle portion 110 and the second handle portion 210 contact with each other, such that the overall shape of the first handle portion 110 and the second handle portion 210 combined with each other is similar to that of a genuine controller of the game host 20. For example, the first handle portion 110 and the second handle portion 210 may be referred as the left part and the right part of a game controller of a PS5. When the first handle portion 110 and the second handle portion 210 are combined with each other, the overall shape of the first handle portion 110 and the second handle portion 210 combined with each other is substantially the same as that of the game controller of the PS5.

On the other hand, when the game controller 10 is in the separated mode, the first handle portion 110 and the second handle portion 210 are separated from each other so as to form an installation space between the first handle portion 110 and the second handle portion 210 for the mobile device 30 to be installed therein. In other words, the mobile device 30 can be clamped between the first handle portion 110 and the second handle portion 210, such that the first handle portion 110 and the second handle portion 210 are respectively located at the left side and the right side of the mobile device 30.

In this embodiment, the stretchable assembly 300 includes a first rail component 310 and a second rail component 320. The first rail component 310 is slidably disposed in the recess mount portion 120. The second rail component 320 is slidably disposed on the protrusion mount portion 220 and the first rail component 310, such that a distance between the first handle portion 110 and the second handle portion 210 is adjustable by a movement of the first rail component 310 and the second rail component 320 relative to each other. In this embodiment, a width of the first rail component 310 is smaller than a width of the second rail component 320, and the first rail component 310 is offset to one side of the second rail component 320.

In this embodiment, the first handle portion 110 has a first positioning groove 150, the second handle portion 210 has a second positioning groove 250, and the first positioning groove 150 and the second positioning groove 250 are configured to receive the mobile device 30.

In this embodiment, the first control handle 100 may further include a directional pad 130. The directional pad 130 is disposed on the first handle portion 110. The second control handle 200 may further include a plurality of functional buttons 230. The functional buttons 230 are disposed on the second handle portion 210.

In this embodiment, the first control handle 100 may further include a stick 140, and the second control handle 200 may further include a stick 240. The sticks 140 and 240 are respectively disposed on the first handle portion 110 and the second handle portion 210.

In this embodiment, the game controller 10 may further include a signal connector 400. The signal connector 400 is, for example, a Lightning or a Type-C connector, and the signal connector 400 is disposed on the second handle portion 210, but the disclosure is not limited thereto; in some other embodiments, the signal connector 400 may be disposed on the first handle portion 110.

In this embodiment, the game controller 10 may further include an audio connector 500. The audio connector 500 is, for example, a 3.5 mm Phone Jack. The audio connector 500 is disposed on the second handle portion 210, but the disclosure is not limited thereto; in some other embodiments, the audio connector 500 may be disposed on the first handle portion 110.

In this embodiment, the game controller 10 may further include a charge connector 600. The charge connector 600 is, for example, a Type-C connector. The charge connector 600 is disposed on the first handle portion 110, but the disclosure is not limited thereto; in some other embodiments, the charge connector 600 may be disposed on the second handle portion 210.

Figure 6:
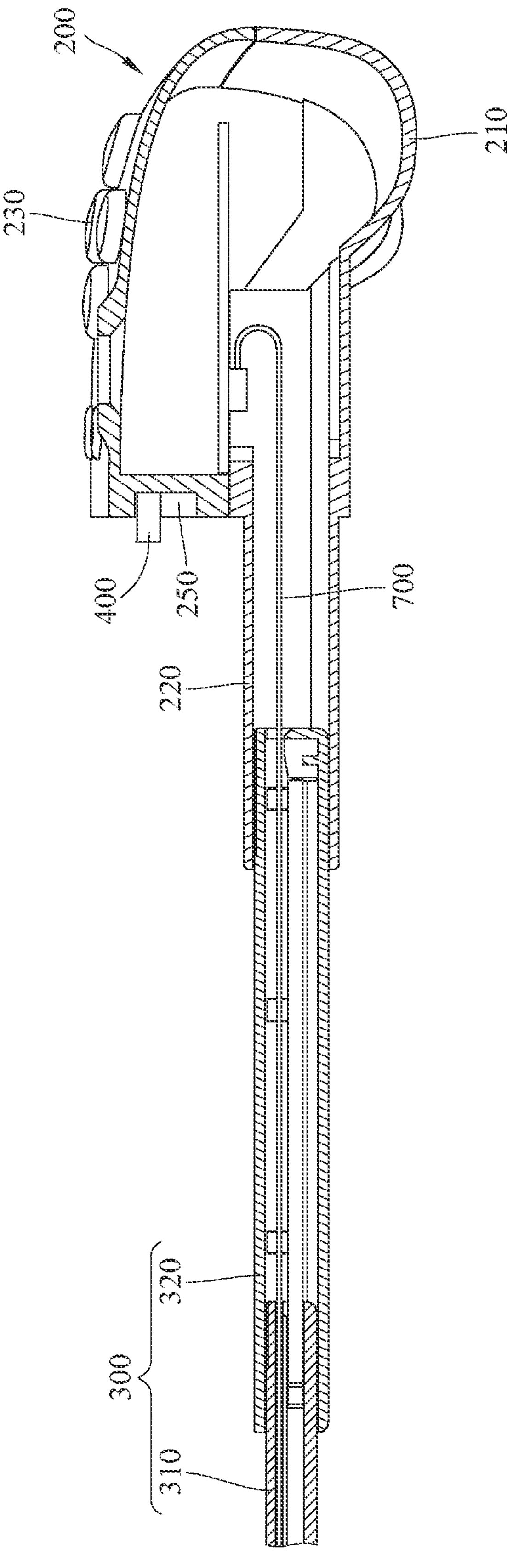
FIG. 6 is a partial cross-sectional view of the game controller in FIG. 3.
Figure 7:
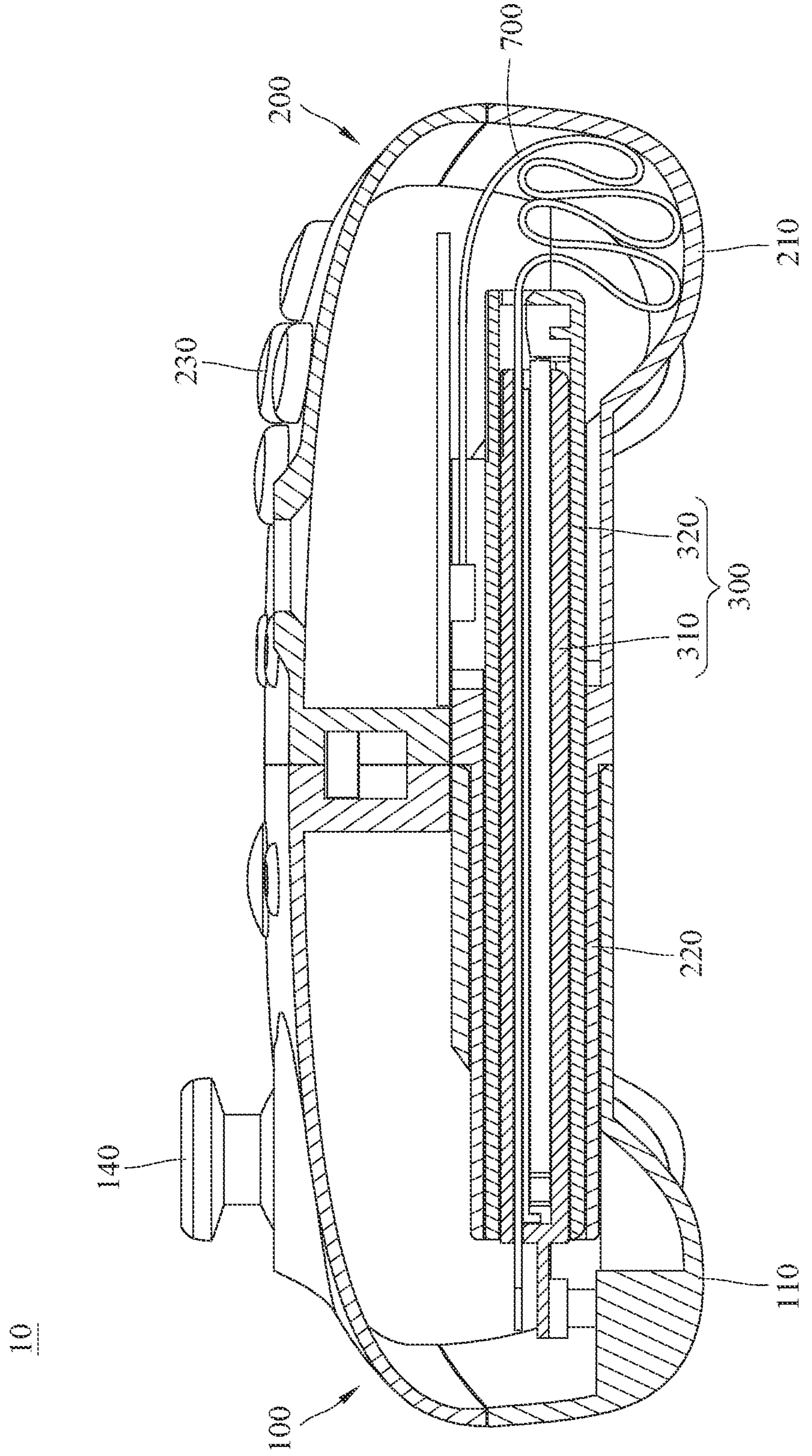
FIG. 7 is a cross-sectional view of the game controller in FIG. 1.

Referring to FIGS. 6 and 7, FIG. 6 is a partial cross-sectional view of the game controller 10 in FIG. 3, and FIG. 7 is a cross-sectional view of the game controller 10 in FIG. 1. In this embodiment, the game controller 10 may further include a wiring component 700. The wiring component 700 is, for example, a flexible wiring board. The wiring component 700 is connected to the first handle portion 110 and the second handle portion 210, and the wiring component 700 is normally in a wavy shape. As a result, when the game controller 10 is changed from the separated mode (e.g., shown in FIG. 6) to the combined mode (e.g., shown in FIG. 7), the wave-shaped wiring component 700 can be neatly and smoothly accommodated in the second handle portion 210. In addition, Mylar may be adhered on portions of the wiring component 700 which are designed to be bent for achieving the wave-shaped wiring component 700.

Figure 10:
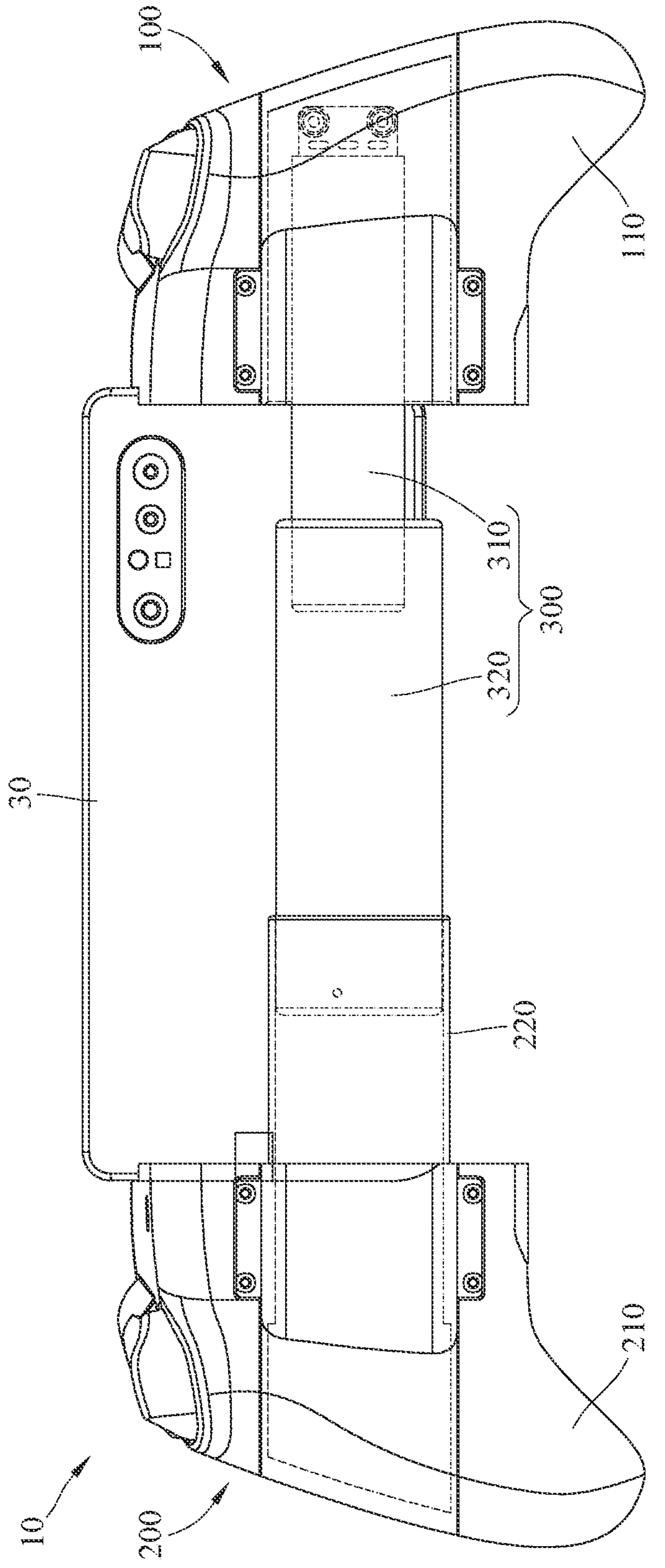

Referring to FIGS. 8 to 10, FIG. 8 is a perspective view of the game controller 10 in FIG. 1 when being cooperated with the game host 20, and FIGS. 9 and 10 are perspective views of the game controller 10 in FIG. 3 when being cooperated with the mobile device 30.

As shown in FIG. 8, the game controller 10 is in the combined mode, and the game controller 10 communicates with the game host 20 via a wireless manner. When the game controller 10 is in the combined mode, the first handle portion 110 and the second handle portion 210 are combined with each other, such that the overall shape of the game controller is substantially the same as that of the genuine game controller of the game host 20. Therefore, a player can experience games with the tactile feedback similar to that of the genuine game controller of the game host 20.

As shown in FIGS. 9 and 10, the game controller 10 is in the separated mode, and the game controller 10 communicates with the mobile device 30 via, for example, wire transmission. Since the game controller 10 is in the separated mode, the mobile device 30 can be clamped between the first handle portion 110 and the second handle portion 210, such that the center of gravity of the game controller 10 clamping the mobile device 30 may be located close to that of the game controller 10 in the combined mode; that is, the center of gravity of the game controller 10 is not changed significantly when the game controller 10 is changed from the combined mode to the separated mode and clamps the mobile device 30. As a result, the player can use the game controller 10 clamping the mobile device 30 with less burden. On the other hand, since the width of the first rail component 310 is smaller than the width of the second rail component 320, and the first rail component 310 is offset to one side of the second rail component 320, cameras of the mobile device 30 can be prevented from being covered by the stretchable assembly 300. Accordingly, the player can use the game controller 10 clamping the mobile device 30 to experience games which require the cameras of the mobile device 30, such as AR mobile games.

According to the game controller as discussed in the above embodiments, the first handle portion and the second handle portion may be combined with or separated from each other so as to be in the combined mode or the separated mode via the cooperation of the recess mount portion and the protrusion mount portion as well as the additional stretchable assembly. As a result, one game controller can be suitable for the game host and the mobile device.

In addition, since the width of the first rail component is smaller than the width of the second rail component, and the first rail component is offset to one side of the second rail component, cameras of the mobile device can be prevented from being covered by the stretchable assembly. Accordingly, the player can use the game controller clamping the mobile device to experience games which requires the cameras of the mobile device, such as AR mobile games.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A game controller, adapted to be cooperated with a game host or a mobile device, comprising:

a first control handle, comprising a first handle portion and a recess mount portion disposed on the first handle portion; and a second control handle, comprising a second handle portion and a protrusion mount portion fixed to disposed on the second handle portion, wherein the protrusion mount portion is slidably accommodated in the recess mount portion;

wherein the protrusion mount portion is slidable relative to the recess mount portion so as to allow the first control handle and the second control handle to be in a combined mode and a separated mode; when the game controller is in the combined mode, the first handle portion and the second handle portion are combined with each other for being cooperated with the game host; when the game controller is in the separated mode, the first handle portion is separated from the second handle portion so as to form an installation space between the first handle portion and the second handle portion for the mobile device to be installed therein, wherein the protrusion mount portion is slidably accommodated in the first handle portion;

wherein the game controller further comprising a stretchable assembly, the stretchable assembly comprises a first rail component and a second rail component, the first rail component is slidably disposed in the recess mount portion, the second rail component is slidably disposed on the protrusion mount portion and the first rail component, and a distance between the first handle portion and the second handle portion is adjustable by a movement of the first rail component and the second rail component relative to each other;

wherein a width of the first rail component is smaller than a width of the second rail component, and the first rail component is offset to one side of the second rail component.

2. The game controller according to claim 1, wherein the first handle portion has a first positioning groove, the second handle portion has a second positioning groove, and the first positioning groove and the second positioning groove are configured to receive the mobile device.

3. The game controller according to claim 1, further comprising a signal connector disposed on the first handle portion or the second handle portion.

4. The game controller according to claim 1, further comprising a charge connector disposed on the first handle portion or the second handle portion.

5. The game controller according to claim 1, further comprising an audio connector disposed on the first handle portion or the second handle portion.

6. The game controller according to claim 1, wherein the first control handle further comprises a directional pad or at least one functional button, and the directional pad or the at least one functional button is disposed on the first handle portion.

7. The game controller according to claim 1, wherein the first control handle further comprises at least one stick, and the at least one stick is disposed on the first handle portion.

8. The game controller according to claim 1, further comprises a wiring component, wherein the wiring component is connected to the first handle portion and the second handle portion, and the wiring component is in a wavy shape.

* * * * *